(12) United States Patent
Kasuga

(10) Patent No.: US 9,097,934 B2
(45) Date of Patent: Aug. 4, 2015

(54) BACKLIGHT UNIT AND LIQUID CRYSTAL DISPLAY DEVICE USING SAID BACKLIGHT UNIT

(75) Inventor: Hiroyuki Kasuga, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 99 days.

(21) Appl. No.: 13/698,177

(22) PCT Filed: May 17, 2010

(86) PCT No.: PCT/JP2010/003307

§ 371 (c)(1),
(2), (4) Date: Jan. 4, 2013

(87) PCT Pub. No.: WO2011/145134

PCT Pub. Date: Nov. 24, 2011

(65) Prior Publication Data

US 2013/0128188 A1  May 23, 2013

(51) Int. Cl.
*G02F 1/1335* (2006.01)
*F21V 8/00* (2006.01)
(Continued)

(52) U.S. Cl.
CPC ............ *G02F 1/1336* (2013.01); *F21V 5/00* (2013.01); *F21V 5/02* (2013.01); *G02B 6/0068* (2013.01); *G02F 1/133603* (2013.01); *G09F 13/04* (2013.01); *G02B 6/0018* (2013.01);
(Continued)

(58) Field of Classification Search
CPC ............ G02F 1/133603; G02F 1/133606; G02F 1/133608; G02F 1/133611
USPC ..................................... 349/61, 64
See application file for complete search history.

(56) References Cited

U.S. PATENT DOCUMENTS 5,587,816 A * 12/1996 Gunjima et al. ............... 349/62
6,456,436 B2 * 9/2002 Miura et al. .................. 359/619
(Continued)

FOREIGN PATENT DOCUMENTS

CN   101548227 A   9/2009
CN   201434226 Y   3/2010
(Continued)

OTHER PUBLICATIONS

International Search Report (ISR) (PCT Form PCT/ISA/210) dated Aug. 17, 2010, in PCT/JP2010/003307.
(Continued)

*Primary Examiner* — Lucy Chien
(74) *Attorney, Agent, or Firm* — McGinn IP Law Group, PLLC

(57) ABSTRACT

In the disclosed backlight unit, multiple LEDs are arranged as a light source at prescribed intervals on a substrate in a rectangular ring. Light irradiated from the LEDs is diffused through a lens, a prism plate and a diffusion plate, and is transmitted to a liquid crystal panel. There are roughly V-shaped concavities in the incidence surface of the lens, and triangular cross-section prisms for diffusing incident light are further arranged on the incidence surface of the prism plate. The LEDs are arranged on a highly thermally conductive LED cooling pattern, and the LED cooling pattern is in contact with a heat-dispersion housing. For that reason, heat emitted by the LEDs is conducted from the LED cooling pattern to the housing and dispersed to the ambient air. By this means, the backlight unit can save energy and be more compact.

20 Claims, 7 Drawing Sheets

(51) Int. Cl.
*F21V 5/00* (2015.01)
*F21V 5/02* (2006.01)
*G09F 13/04* (2006.01)

(52) U.S. Cl.
CPC .............. *G02B6/0038* (2013.01); *G02B 6/0073* (2013.01); *G02F 2001/133607* (2013.01); *G02F 2001/133628* (2013.01)

(56) References Cited

U.S. PATENT DOCUMENTS

| | | | |
|---|---|---|---|
| 8,212,967 B2 | 7/2012 | Park et al. | |
| 2006/0087866 A1* | 4/2006 | Ng et al. | 362/612 |
| 2007/0070530 A1 | 3/2007 | Seo et al. | |
| 2008/0111944 A1* | 5/2008 | Sakai | 349/61 |
| 2010/0053496 A1* | 3/2010 | Park et al. | 349/61 |
| 2010/0066944 A1* | 3/2010 | Mei et al. | 349/62 |
| 2011/0019126 A1* | 1/2011 | Choi et al. | 349/61 |
| 2011/0317096 A1 | 12/2011 | Yokota et al. | |

FOREIGN PATENT DOCUMENTS

| | | |
|---|---|---|
| JP | 2007-96318 A | 4/2007 |
| JP | 2007-311561 A | 11/2007 |
| JP | 2008-41546 A | 2/2008 |
| JP | 2010-56061 A | 3/2010 |
| JP | 4461197 B1 | 5/2010 |
| TW | 200619769 A | 6/2006 |

OTHER PUBLICATIONS

Chinese Office Action dated May 5, 2014 with English translation.
Chinese Office Action dated Nov. 2, 2014 with English translation.

* cited by examiner

FIG. 5
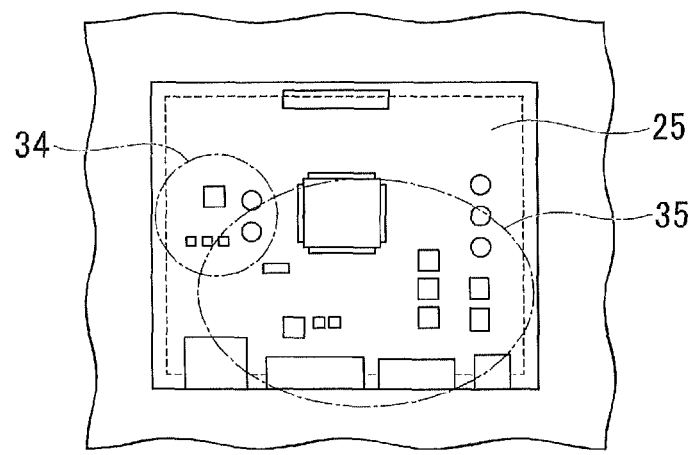
FIG. 6A
FIG. 6B
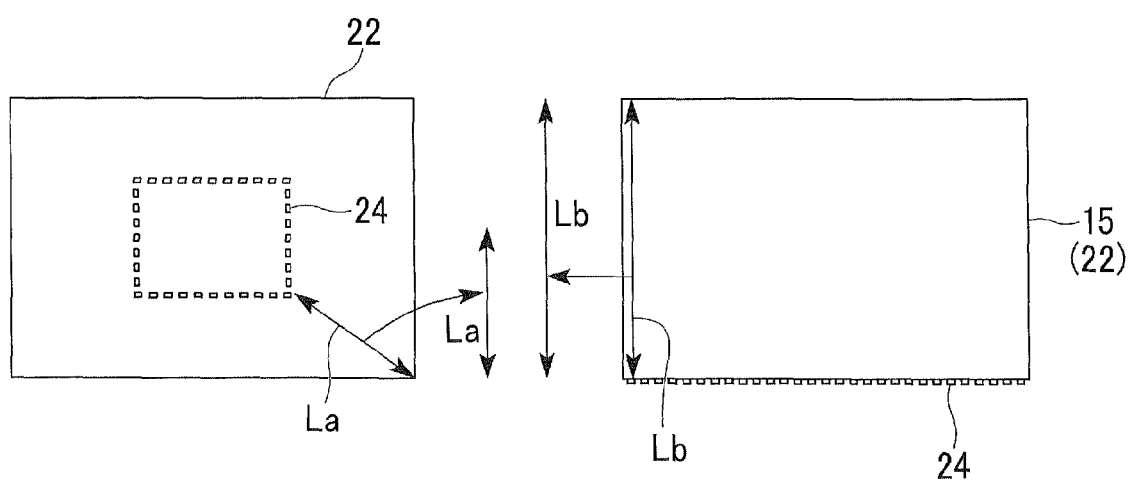

BACKLIGHT UNIT AND LIQUID CRYSTAL DISPLAY DEVICE USING SAID BACKLIGHT UNIT

TECHNICAL FIELD

The present invention relates to a backlight unit for displaying a liquid crystal panel or the like, and a liquid crystal display device using the backlight unit.

BACKGROUND ART

In the related art, as a backlight unit of a liquid crystal display device using a solid light source element (for example, an LED element) as a light source for illumination, there have been a type called a direct type in which, for example, an LED element is arranged over the whole surface as a light source at a back side of a liquid crystal panel via an optical element, and a type called a side lamp type (or a side edge type) in which a light guide plate is provided at the back side of the liquid crystal panel and the LED elements are arranged in a thickness direction thereof in a line form.

For example, a backlight unit 1 of a direct type illustrated in FIG. 9 is provided with an LED backlight array 2 in which a plurality of LEDs as a light source are vertically and horizontally arranged, and a reflection plate 4 fixed to a back chassis 3 is provided at the back side thereof. A dual brightness enhancement film (DBEF) 5 which diffuses light emitted from the plurality of LEDs in a travelling direction of light, a prism film 6, and a diffusion film 7 are sequentially disposed in a light-emitting direction of the LEDs. Furthermore, at the back side of the back chassis 3, a drive circuit board 11, which drives the LEDs and a liquid crystal panel 10, is provided.

Moreover, the liquid crystal panel 10 is disposed at a further light-emitting side of the diffusion film 7 in the backlight unit 1, and thus these components constitute a liquid crystal display device 12.

The direct type backlight unit 1 has a configuration in which the plurality of LEDs are arranged to face the whole back of the liquid crystal panel 10.

As a related art that includes such a direct type backlight unit, for example, there are inventions described in Patent Documents 1, 2 and 3.

Furthermore, in a side lamp type backlight unit 14 in a liquid crystal display device 12 illustrated in FIG. 10, as in the above-mentioned direct type backlight unit 1, the drive circuit board 11, the back chassis 3, the reflection plate 4, the brightness enhancement film (DBEF) 5, the prism film 6, and the diffusion film 7 are sequentially arranged from the back side. Furthermore, a light guide plate 15 is disposed between the reflection plate 4 and the brightness enhancement film 5, and an LED backlight array 16, in which the LEDs are arranged in a line along a side of the light guide plate 15 in a thickness direction, is provided.

Moreover, the liquid crystal panel 10 is disposed at a further light-emitting side of the backlight unit 14.

DOCUMENTS OF THE PRIOR ART

Patent Documents

Patent Document 1: Japanese Unexamined Patent Application, First Publication No. 2007-96318
Patent Document 2: Japanese Unexamined Patent Application, First Publication No. 2007-311561
Patent Document 3: Japanese Unexamined Patent Application, First Publication No. 2008-41546

DISCLOSURE OF INVENTION

Problems to be Solved by the Invention

However, since the direct type backlight unit 1 of the related art, has the configuration in which a plurality of LEDs are arranged as the LED backlight array 2 over the whole surface in the horizontal direction and the vertical direction, there is a defect in that the electric power consumption of the LEDs increases, which is not conducive to electric power saving. Furthermore, there is a defect in that, since it is difficult to effectively radiate heat generated in the plurality of LEDs, the light-emitting efficiency of the LEDs becomes low and electric power saving is also difficult to achieve from this viewpoint.

Furthermore, since the side lamp type backlight unit 14 has a configuration in which the LEDs are arranged on the side of the light guide plate 15 in the thickness direction, there is a defect in that the side portion of the liquid crystal display device 12 is expanded and the size thereof becomes larger.

The present invention has been achieved in view of the above circumstances, and it is an object of the present invention to provide a backlight unit that can save electric power and can be downsized, and a liquid crystal display device using the same.

Means for Solving the Problem

According to an aspect of the present invention, there is provided a backlight unit that includes a plurality of solid light source elements disposed as a light source, an optical element which is disposed in front of the plurality of solid light source elements in a light-emitting direction to diffuse light irradiated from the solid light source elements, and a housing, wherein the plurality of solid light source elements are disposed in an annular form.

With the backlight unit according to the present invention, since light emitted from the solid light source elements arranged in an annular form can be broadly diffused via the optical element, compared to the direct type backlight unit of the related art, electric power can be saved by reducing the number of solid light source elements as the light source, and it is possible to uniformly diffuse the emitted light from the solid light source elements. Furthermore, since the light source is not provided on the side compared to the side light type backlight unit of the related art, it is possible to prevent the backlight unit from being expanded in a lateral direction.

Furthermore, it is preferable that the plurality of solid light source elements be disposed in a radiating pattern with high heat conductivity and the radiating pattern be connected to the housing.

With the backlight unit according to the present invention, since it is possible to conduct heat generated from the solid light source elements emitting light to the radiating pattern, conduct heat from the radiating pattern to the housing, and radiate heat to the outdoor air, the temperature of the solid light source element drops and the light-emitting efficiency is improved. Thus, electric power can be saved.

Furthermore, as the optical element, a prism member that is provided to face the plurality of solid light source elements in the light-emitting direction, and a lens element that is provided between the plurality of solid light source elements and the prism member and is provided with a substantially V-shaped concave portion may be included, and light emitted from the solid light source elements may be diffused and emitted by the lens element and the prism member.

Since light emitted from the solid light source elements is diffused by penetrating the lens element and is widely diffused by the prism member, light of uniform brightness can be emitted.

Furthermore, as the optical element, a prism member provided with a substantially inverted V-shaped concave portion facing the plurality of solid light source elements in the light-emitting direction may be included, and light emitted from the solid light source elements may be diffused and emitted by the prism member.

Light emitted from the solid light source elements arranged in an annular form is subjected to refraction, reflection or the like through the prism member, and is widely diffused and emitted, and thus it is possible to suppress the drop of the brightness and maintain high brightness.

Furthermore, the plurality of solid light source elements may be arranged in a substantially rectangular annular form, and the solid light source elements may be arranged so that a central region of each side in the substantial rectangle is provided at a sparse interval compared to a corner portion thereof.

In this case, it is preferable that the solid light source elements arranged in the substantially rectangular annular form be smaller than external shapes of the display element and the prism member.

Alternatively, the plurality of solid light source elements may be arranged in the substantially rectangular annular form, and the solid light source element, in which the central region of each side in the solid light source elements arranged in the substantially rectangular form has a light quantity that is relatively smaller than that of the corner portion thereof, may be included.

In this case, it is also preferable that the solid light source elements arranged in the substantially rectangular annular form be smaller than external shapes of the display element and the prism member.

In addition, the plurality of solid light source elements may be arranged in a substantially circular form or a substantially elliptical annular form.

In this case, since light emitted from the solid light source elements arranged in an annular form can also be broadly diffused via the optical element, electric power can be saved by reducing the number of solid light source elements as the light source, compared to the direct type backlight unit of the related art, and it is possible to uniformly diffuse the emitted light from the solid light source elements. Furthermore, since the light source is not provided on the side compared to the side light type backlight unit of the related art, it is possible to prevent the backlight unit from being expanded in a lateral direction.

In addition, it is preferable that the solid light source elements be the LED.

According to another aspect of the present invention, there is provided a liquid crystal display device that includes the backlight unit mentioned above, and a liquid crystal panel that is disposed in a light-emitting direction of the backlight unit.

Effect of the Invention

As mentioned above, with the backlight unit and the liquid crystal display device according to the present invention, since light emitted from the solid light source elements arranged in an annular form can be broadly diffused via the optical element, the number of solid light source elements can be reduced compared to the direct type backlight unit of the related art, and electric power can be saved.

Furthermore, since the solid light source elements are provided on the back side to face the optical element, compared to the side light type backlight unit of the related art, the device can be downsized without being expanded to the side, a maximum optical path length reaching from the solid light source elements to the display element can be set short, and thus it is easy to achieve uniformity of the brightness.

BRIEF DESCRIPTION OF THE DRAWINGS

FIG. 5 is a diagram that illustrates a back of the substrate equipped with the LED.

FIGS. 6A and 6B are schematic diagrams that illustrate a positional relationship between the liquid crystal panel and an arrangement pattern of the LED, and an optical path length from the LED, FIG. 6A is a diagram according to the first embodiment, and FIG. 6B is a diagram according to a side lamp type of the related art.

FIG. 8A illustrates a first modified example, FIG. 8B illustrates a second modified example, and FIG. 8C illustrates a third modified example.

EMBODIMENTS FOR CARRYING OUT THE INVENTION

Hereinafter, an embodiment of the present invention will be described based on the accompanying drawings.

Firstly, a liquid crystal display device including a backlight unit according to a first embodiment of the present invention will be described using FIGS. 1 to 6.

Figure 1:
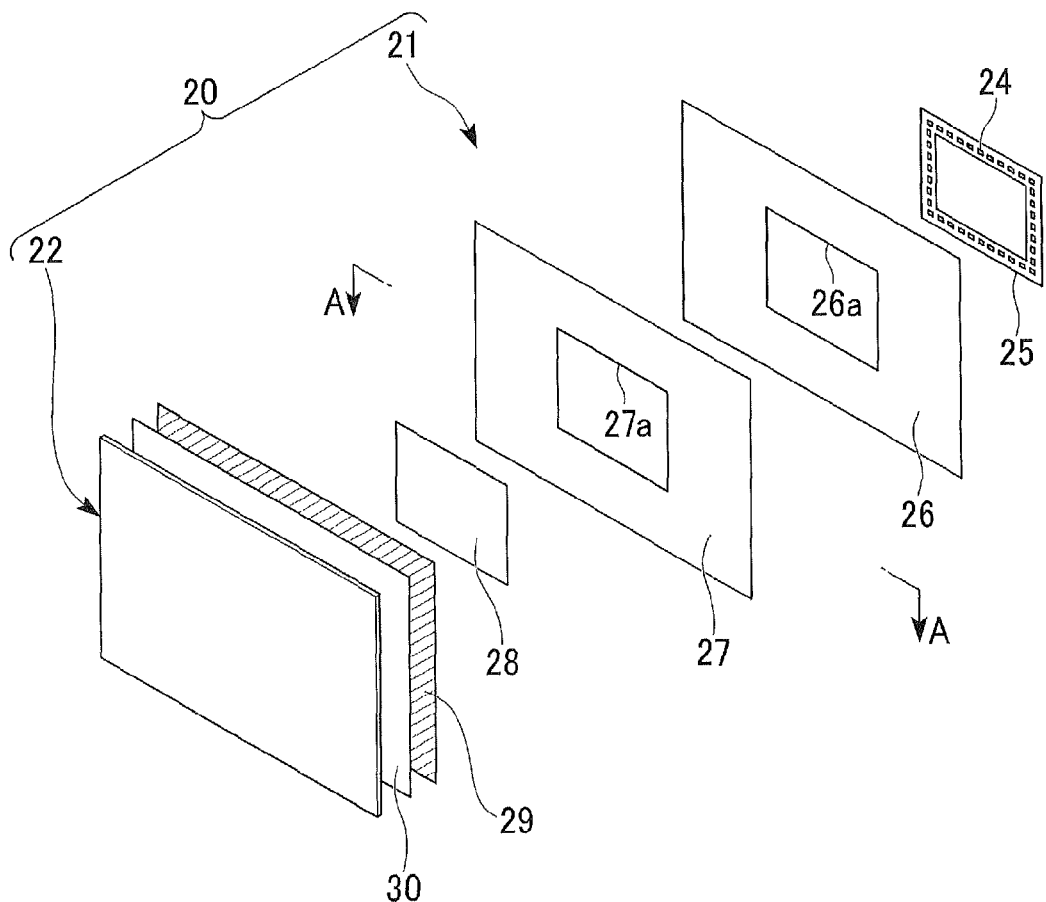
FIG. 1 is an exploded perspective view that schematically illustrates a configuration of a liquid crystal display device including a backlight unit according to a first embodiment of the present invention.
Figure 2:
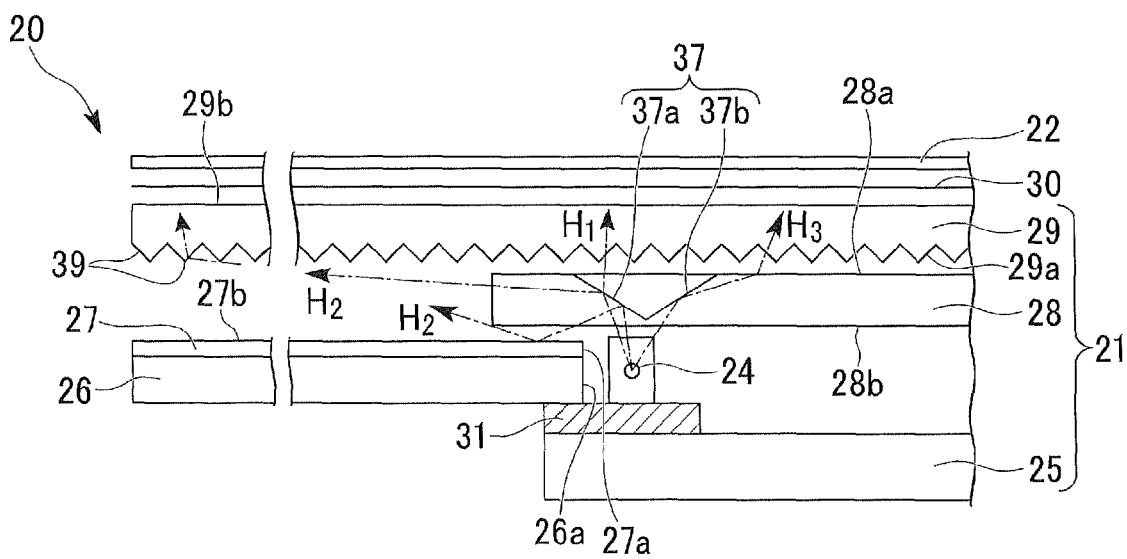
FIG. 2 is a cross-sectional view of major parts that illustrates the configuration of the liquid crystal display device according to the first embodiment.

As shown in FIG. 1, a liquid crystal display device 20 includes a backlight unit 21 and a liquid crystal panel 22. As shown in FIGS. 1 and 2, the backlight unit 21 is configured by sequentially arranging a substrate 25 in which a plurality of LEDs 24 are arranged as a light source in a rectangular frame form at predetermined intervals, a housing 26 and a reflection plate 27 laminated and disposed at a light-emitting side of the LEDs 24, a lens 28 that diffuses light emitted from the LEDs 24, a prism plate 29 that further diffuses the diffused light, and a diffusion plate 30.

Furthermore, the liquid crystal panel 22 is constituted by a liquid crystal element and polarizing plates laminated on a front and back thereof.

Figure 3:
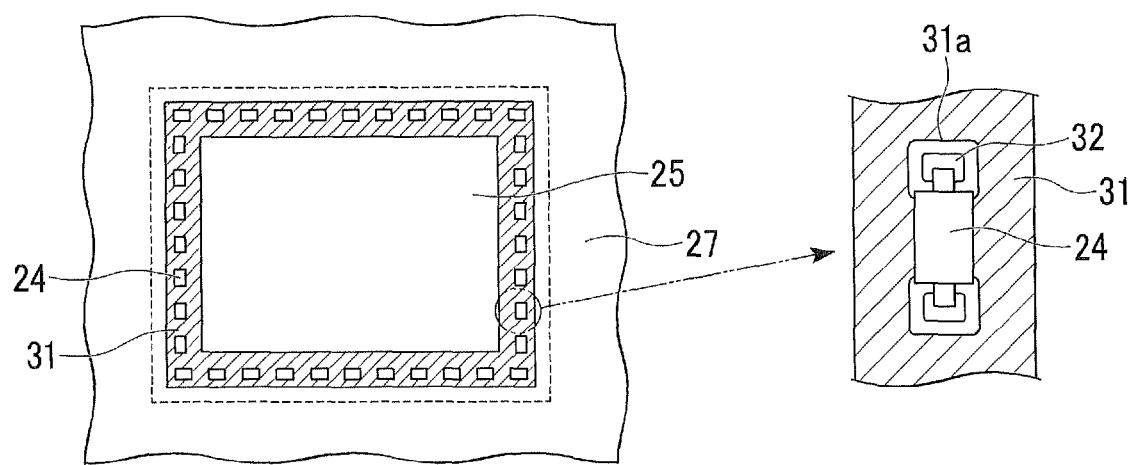
FIG. 3 is a plan view that illustrates an LED, a cooling pattern and an enlarged view of the LED.

Moreover, as shown in FIGS. 1 and 3, the substrate 25 in the backlight unit 21 is formed, for example, in a rectangular plate shape having an external form that is smaller than that of the liquid crystal panel 22, and a rectangular frame-shaped LED cooling pattern 31 is fixed along each side of the substrate 25. On the cooling pattern 31, the LEDs 24 are fixed to the substrate 25 or the like, for example, using soldering or the like, at predetermined intervals and the cooling pattern 31 is formed of a material such as a metal having high thermal conductivity, for example, a copper foil so as to release the heating of the LEDs 24 emitting the light.

Figure 4:
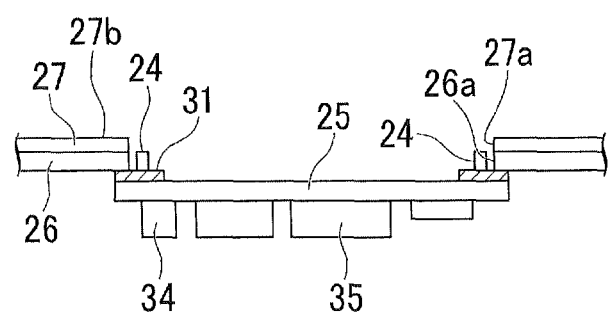
FIG. 4 is a partial cross-sectional view that illustrates an installation structure of the LED to a substrate.

Terminals of the LEDs 24 fixed to the substrate 25 are inserted to aperture portions 31a formed in the cooling pattern 31 in a non-contact manner and are connected to an electrode 32 provided in the substrate 25. For that reason, the respective LEDs 24 are laminated on the cooling pattern 31 in a non-electric conduction state and are joined to the substrate 25. In FIGS. 4 and 5, an LED drive circuit 34 having the electrode 32 and a drive circuit 35 for driving the liquid crystal panel 22 are fixed to the back of the substrate 25.

In FIG. 3, the LED cooling pattern 31 of the substrate 25 is formed to have a width that is greater than those of the LEDs 24. Moreover, as shown in FIG. 4, central portions of a housing 26 and a reflection plate 27 are formed with rectangular window portions 26a and 27a that are greater than the LEDs 24 arranged in an annular form to have inner diameters smaller than that of the substrate 25, and the frame of the window portion 26a of the housing 26 is disposed so as to come into contact with the LED cooling pattern 31 over the whole circumference. The housing 26 is formed of, for example, a material having high thermal conductivity such as aluminum. For that reason, it is possible to transmit heat generated from the LEDs 24 from the LED cooling pattern 31 to the housing 26 and radiate heat to the ambient air.

Furthermore, in the reflection plate 27, a surface facing the lens 28 of an opposite side of a joining surface coming into contact with the housing 26 is a reflection surface 27b.

Moreover, the lens 28 shown in FIG. 2 is formed, for example, in a rectangular form having a dimension that is greater than that of the substrate 25 and is smaller than those of the prism plate 29 and the liquid crystal panel 22. On a surface 28a of the lens 28 facing the prism plate 29, in a region facing the respective LEDs 24 provided in the substrate 25, a concave portion 37 having a substantially V-shaped cross-section is formed, and a trough line formed by two slope surfaces 37a and 37b of the concave portion 37 is preferably located to bias to a central side of the lens 28 compared to the center of the LED 24. In addition, the concave portion 37 may be continuously formed in a rectangular frame shape along the arrangement of the LEDs 24 and may be separately formed for each LED 24.

For that reason, most of the light emitted from the LEDs 24 is incident on the external slope surface 37a of the concave portion 37, a part of the light is reflected and faces the prism plate 29 or is reflected by the refection surface 27a of the reflection plate 27 and faces the prism plate 29, and the remaining light is refracted by the slope surface 37a and transmitted. Furthermore, a part of light emitted from the LEDs 24 is reflected by the internal slope surface 37a of the concave portion 37 or is refracted and is transmitted.

Furthermore, in FIG. 2, in the prism plate 29 forming a prism member, on an incident surface of the lens 28 side, a plurality of prisms 39 having a triangular cross-section extend in a certain direction, for example, a direction perpendicular to a paper and are arranged and formed in parallel. An emitting surface 29b of the diffusion plate 30 side is, for example, a plane. Moreover, light traveling toward the prism plate 29 is refracted by the slope surfaces of the plurality of prisms 39 and transmitted by the prism plate 29.

Since the prism plate 29 has a configuration in which the prisms 39 are arranged in one direction, it is possible to diffuse the incident light so as to be uniform only in a direction perpendicular to an extension direction of the prisms 39. For example, since the diffusion particles are randomly dispersed and mixed, the diffusion plate 30 is able to randomly diffuse the incident light.

As shown in FIG. 6A, in the backlight unit 21 according to the present embodiment, because a plurality of LEDs 24 are arranged as a light source to have a dimension smaller than that of an external shape forming a rectangular form of the liquid crystal panel 22 in an annular form, the number of the LEDs 24 thereof is smaller than that of the LED light source of the direct type backlight unit of the related art. Furthermore, if the plurality of LEDs 24 arranged in the rectangular form are formed to have a small shape analogously to the liquid crystal panel 22, the maximum optical path length until light emitted from the LEDs 24 reaches the farthest position (for example, a corner portion) of the liquid crystal panel 22 is a length La in a diagonal direction when viewed from the plane.

Meanwhile, in the side lamp type backlight unit of the related art shown in FIG. 6B, in order to arrange the LEDs 24 on one side of the light guide plate 15 in the thickness direction in a row, the external form dimensions of the liquid crystal panel 22 and the light guide plate 15 are equal to each other, and the maximum optical path length becomes a length Lb (>La) corresponding to a side that is adjacent to a side on which the LEDs 24 are disposed.

For this reason, in the backlight unit 21 according to the present embodiment, since the maximum optical path length La can be shorter than Lb, the drop of the brightness of light can be reduced.

The liquid crystal display device 20 having the backlight unit 21 according to the present embodiment has the above-mentioned configuration, and next, the operation thereof will be described.

In FIGS. 1 to 3, light H emitted from the LEDs 24 fixed to the substrate 25 on the LED cooling pattern 31 and arranged in a rectangular frame shape is emitted forward and is incident from an incident surface 28b of the lens 28. Moreover, a partial light H1 is refracted in the lens 28 and is emitted from the concave portion 37 having a substantially V-shaped cross-section formed on the emitting surface 28a.

Furthermore, partial lights H2 and H3 are reflected by the slope surfaces 37a and 37b of the concave portion 37 and advance to the outside and the inside of the lens 28, and a part of the light H2 advancing to the outside of the lens 28 advances in a direction of the prism plate 29 disposed at the light-emitting side of the lens 28 or advances to the reflection plate 27. Furthermore, a part of the light H3 advancing to the inside of the lens 28 also advances in a direction of the prism plate 29 disposed at the light-emitting side of the lens 28. The light H2 advancing to the reflection plate 27 is reflected by the reflection surface 27a of the reflection plate 27 and advances in a direction of the prism plate 29.

Moreover, the lights H1, H2 and H3 advancing to the prism plate 29 are incident from one slope surface of the prism 39 arranged on the incident surface, are refracted to a central shaft side of the backlight unit 21, and advance in a direction of the diffusion plate 30.

In the prism plate 29, it is possible to diffuse the incident light so as to be substantially uniform only in a direction perpendicular to the extension direction of the plurality of prisms 39. The incident light cannot be diffused in the extension direction of the prisms 39.

Moreover, when light diffused by the prism plate 29 is incident to the diffusion plate 30, it is possible to randomly diffuse the incident light in directions including an extension direction of the prisms 39 by the diffusion particles that are randomly dispersed and mixed. In this manner, light, which is substantially uniformly diffused over the whole liquid crystal panel 22, is incident from the diffusion plate 30 on the whole liquid crystal panel 22 and transmitted, and thus it is possible to view a liquid crystal image of a substantially uniform brightness.

Furthermore, in FIGS. 2 to 4, by causing the LEDs 24 to emit light as mentioned above, although the LEDs 24 generate heat, heat generated by the LEDs 24 is transmitted to the housing 26 formed of a material with a high thermal conductivity coming into contact with the aperture portion 26*a* via the LED cooling pattern 31 provided in the substrate 25, and is radiated to the ambient air via the housing 26. For that reason, the LEDs 24 can be rapidly cooled.

As mentioned above, according to the liquid crystal display device 20 including the backlight unit 21 according to the present embodiment, since it is possible to diffuse light, which is emitted from the plurality of LEDs 24 smaller than the liquid crystal panel 22 and arranged in a rectangular annular form, to the entire liquid crystal panel 22 by reflecting or refracting the light using the lens 28, the prism plate 29 and the diffusion plate 30, the number of the LEDs 24 to be used can be reduced compared to the direct type liquid crystal display device of the related art, and electric power can be saved.

In addition, since the substrate 25, on which the LEDs 24 are arranged as the light source in an annular form, is placed at the back side of the liquid crystal display device 20, it is possible to prevent to the side from expanding, compared to the side lamp type liquid crystal display device of the related art. As shown in FIG. 6, since the maximum optical path length La from the LEDs 24 to the corner portion which is the farthest position of the liquid crystal panel 22 can be shortened compared to the side lamp type liquid crystal display device of the related art, uniformity of the brightness of the liquid crystal screen is high.

Furthermore, since heat generated in the LEDs 24 can be transmitted to the housing 26 via the LED cooling pattern 31 with high thermal conductivity on the substrate 25 and can be radiated to the ambient air, the temperature of the LEDs 24 is lowered, the light-emitting efficiency of the LEDs 24 can be improved, and electric power can be saved.

Next, although a liquid crystal display device including a backlight unit according to a second embodiment of the present invention will be described with reference to FIG. 7, the same portions and members as or similar portions and members to those of the above-mentioned first embodiment are denoted by the same reference numerals and the descriptions thereof will be omitted.

Figure 7:
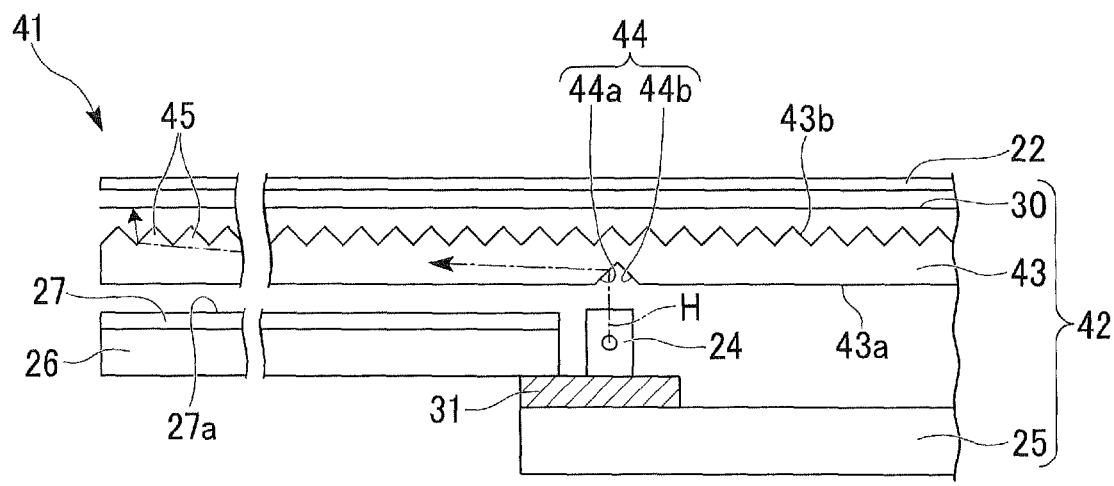
FIG. 7 is a cross-sectional view of major parts that illustrates a configuration of a liquid crystal display device according to a second embodiment of the present invention.

In a backlight unit 42 of a liquid crystal display device 41 according to a second embodiment shown in FIG. 7, the lens 28 is not provided, unlike the above-mentioned first embodiment. Moreover, a prism plate 43 is provided at the light-emitting surface side of the LEDs 24 fixed to the substrate 25 via the LED cooling pattern 31.

In the prism plate 43, an incident surface 43*a* of light facing the LEDs 24 is substantially a plane, and a concave portion 44 with an inverted V-shaped cross-section is formed at a position facing the LEDs 24. The concave portion 44 is formed by two slope surfaces 44*a* and 44*b* so as to form an inverted V-shaped cross section, and the trough lines of the slope surfaces 44*a* and 44*b* are disposed to bias to the central side of the prism plate 43 compared to the center of the LEDs 24. The concave portion 44 forming the inverted V-shaped cross-section may be formed in a continuously rectangular annular form facing the plurality of LEDs 24, and may be separately formed for each LED 24.

Furthermore, for example, the prisms 45 with a triangular cross-section are arranged on the emitting surface 43*b* facing the incident surface 43*a* of the prism plate 43. The plurality of prisms 45 extend in a direction perpendicular to a paper and are arranged and formed in a direction parallel to the paper in parallel.

For that reason, the light H emitted from the LEDs 24 enters the prism 43, for example, by being refracted by one or the other of the slope surfaces 44*a* and 44*b* of the concave portion 44 in the incident surface 43*a* of the prism 43 or the like, a part of light advances forward as it is, and the other light laterally advances to the outside or the inside and is refracted by some slope surfaces of the plurality of prisms 45 of the emitting surface 43*b*.

Moreover, after light is diffused in a direction perpendicular to the extension direction of the prisms 45 and is emitted from the prism plate 43, light is subjected to the diffusion action of the diffusion plate 30, and light is vertically and horizontally diffused and is incident on the liquid crystal panel 22. Furthermore, a part of light is reflected by the incident surface 43*a* of the prism plate 43 or the slope surfaces 44*a* and 44*b* of the concave portion 44, is reflected by the reflection surface 27*a* of the reflection plate 27 again, and enters the prism plate 43.

For that reason, consequentially, light emitted from the LEDs 24 is diffused to the whole liquid crystal panel 22 by repeating the refraction and the reflection using the prism plate 43 and the reflection plate 27.

As mentioned above, even in the backlight unit 42 according to the second embodiment, the similar working effect to that of the first embodiment can be exhibited, and since the lens 28 is not provided, there are few transmitting optical members, and the drop of the brightness can be suppressed.

Next, in the backlight units 21 and 42 according to the respective embodiments of the present invention mentioned above, a modified example of the annular arrangement configuration of the LEDs 24 on the substrate 25 will be described with reference to FIG. 8.

In the respective embodiments mentioned above, with regard to the external shape of the liquid crystal panel 22, although the LEDs 24 on the substrate 25 are formed, for example, in a substantially rectangular annular form that is analogously small, the arrangement configuration of the LEDs 24 according to the present invention is not limited to the above-mentioned configuration.

Figure 8A:
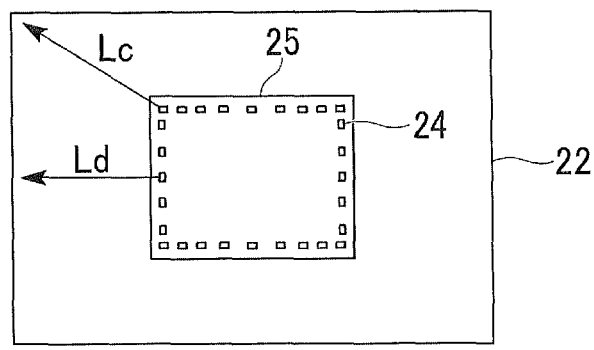
FIGS. 8A to 8C illustrate modified examples of the arrangement pattern of the LED to the substrate.

For example, in a first modified example shown in FIG. 8A, the plurality of LEDs 24 arranged on the substrate 25 are formed, for example, in a rectangular form. Moreover, the plurality of LEDs 24 on each side have a configuration in which the arrangement intervals are changed so that the arrangement intervals in the central portion of the side are sparse, and the arrangement intervals in the corner portion are dense.

Herein, light emitted from the respective LEDs 24 is refracted or reflected via the lens 28 and the prism plate 29 or the prism plate 43, the diffusion plate 30 or the like, the light quantity is attenuated, and the brightness is lowered until light reaches the liquid crystal panel 22.

For that reason, when arranging the plurality of LEDs 24 in a rectangular form, with regard to the optical path length from the LEDs 24 arranged in the rectangular form to four sides of the liquid crystal panel 22, an optical path length Lc from the LEDs 24 of the corner portion to the corner portion of the liquid crystal panel 22 is the largest, and an optical path length Ld from the LEDs 24 of the central portion of the side to the central portion of the side of the liquid crystal panel 22 is the shortest. For that reason, by sparsely arranging the intervals of the LEDs 24 located to face the central portion of the side of the liquid crystal panel 22 and densely arranging the intervals of the LEDs 24 located to face the corner portion of the liquid crystal panel 22, a liquid crystal image of more uniform brightness is provided in the whole liquid crystal panel 22.

Figure 8B:
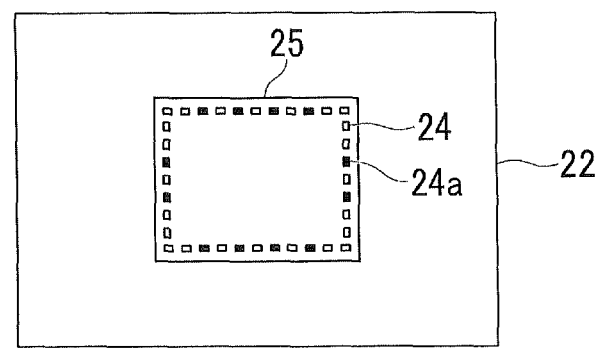

Next, in a second modified example shown in FIG. 8B, the plurality of LEDs 24 arranged on the substrate 25 are arranged in a rectangular annular form at equal intervals. As an LED 24a arranged in the central portion of each side, an LED having a brightness smaller than that of the LED 24 located in the corner portion is arranged, or an LED in which brightness is adjusted to be small and set is arranged.

With such a configuration, since brightness of the LED 24a arranged in the central portion of the side is smaller than that of the LED 24 arranged in the corner portion, brightness of the corner portion of the liquid crystal panel 22 is substantially equal to that of the central portion of the side thereof. Thus, as in the first modified example, the liquid crystal image of more uniform brightness is provided in the whole liquid crystal panel 22.

Even in the first and second modified examples, by lowering the light quantity of the side central portion of the LEDs 24 compared to the corner portion, uniformity of the brightness of the liquid crystal screen can be improved, and an effect of electric power saving is provided.

Figure 8C:
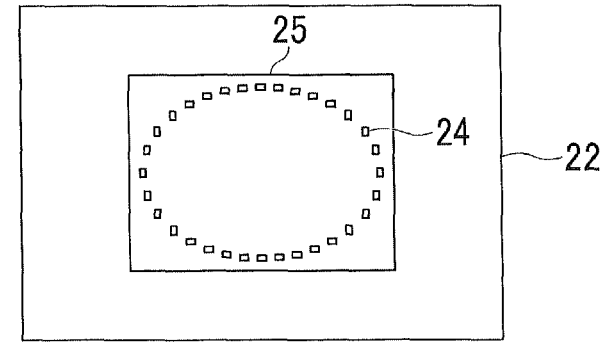
Figure 9:
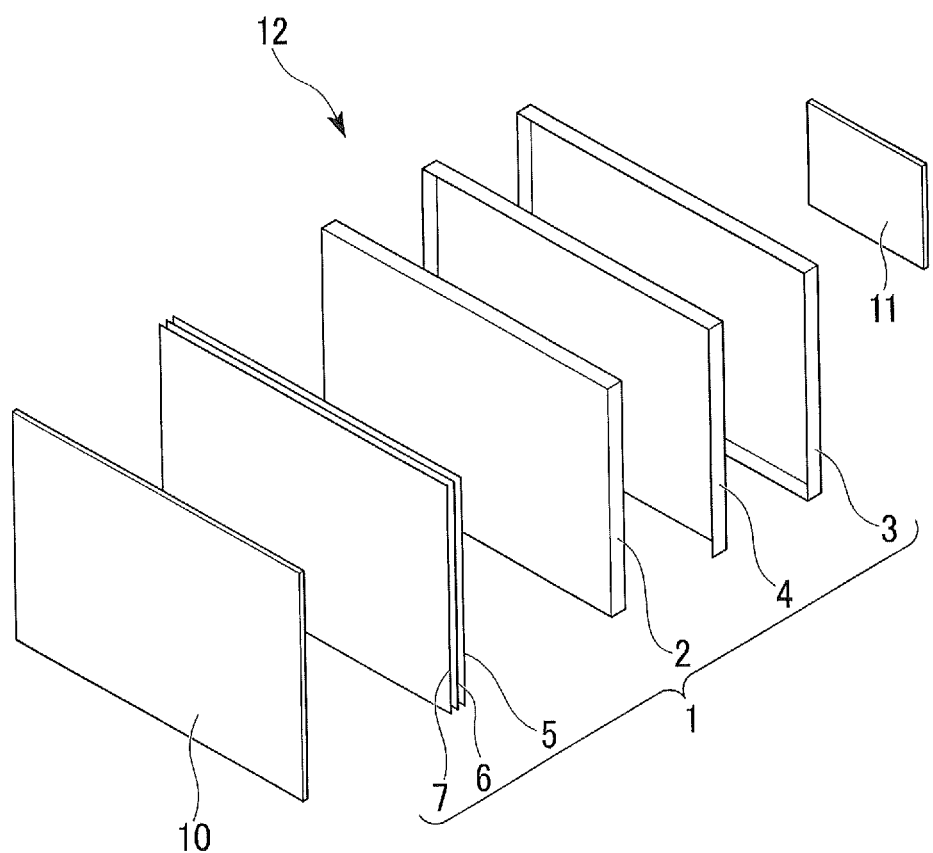
FIG. 9 is an exploded view that schematically illustrates a configuration of the liquid crystal display device including the backlight unit of the direct type of the related art.
Figure 10:
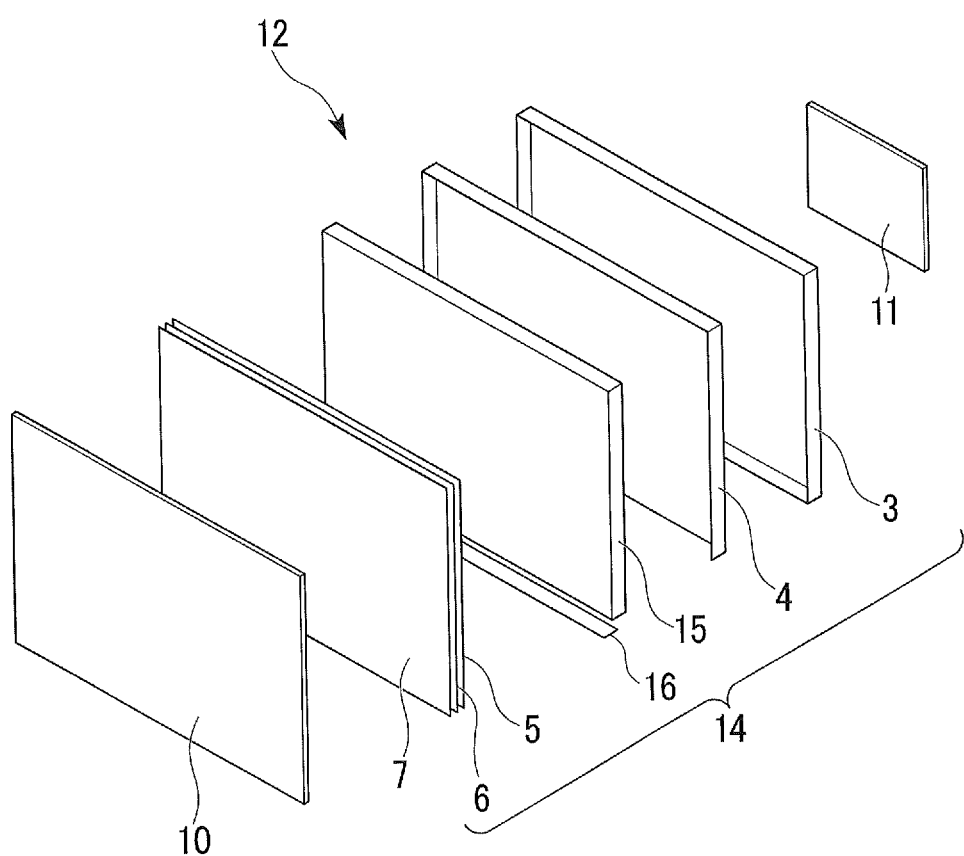
FIG. 10 is an exploded view that schematically illustrates the liquid crystal display device including the backlight unit of the side lamp type of the related art.

Furthermore, the arrangement structure of the plurality of LEDs 24 on the substrate 25 is not limited to the rectangular annular form. For example, as shown in FIG. 8C, the LEDs may be arranged in an elliptical form, circle, or suitable polygons such as a hexagon and an octagon may be used. Furthermore, a configuration or the like in which the LEDs 24 are randomly dispersed and arranged within a suitable annular frame using the LEDs 24 may be adopted.

In addition, as the arrangement configuration of the backlight units 21 and 42, although the units are configured so as to uniformly diffuse light by the prism plates 29 and 43 in which the plurality of prisms 39 and 45 are arranged in one direction and the diffusion plate 30 in the above-mentioned embodiments, in order to widely form a field of view in a transverse direction (horizontal direction) compared to a longitudinal direction (vertical direction) in the liquid crystal display devices 20 and 41, it is desirable to vertically extend the prisms 39 and 45 of the prism plates 29 and 43 and horizontally arrange the prisms.

Furthermore, the backlight units 21 and 42 according to the present invention can be adapted to other transmission type and reflection type display devices, without being limited to the liquid crystal display devices 20 and 41 that transmit and display the liquid crystal panel 22.

As mentioned above, although the preferred embodiments, the modified examples or the like of the present invention have been described, the present invention is not limited to the embodiments, the modified examples mentioned above or the like. Additions, omissions, substitutions, and other variations may be made to the present invention without departing from the spirit and scope of the present invention. The present invention is not limited by the above description, but only by the appended claims.

INDUSTRIAL APPLICABILITY

The present invention provides a backlight unit which saves electric power and is downsized by disposing LEDs as a light source of a backlight unit on the back of an optical element such as a prism member in an annular form, and a liquid crystal display device using the same.

DESCRIPTION OF REFERENCE SYMBOLS 20, 41 liquid crystal display device
21, 42 backlight unit
22 liquid crystal panel
24 LED
25 substrate
26 housing
27 reflection plate
28 lens
29, 43 prism plate
30 diffusion plate
31 LED cooling pattern
37, 44 concave portion
37a, 37b, 44a, 44b slope surface
39, 45 prism

The invention claimed is:

1. A backlight unit comprising:
a substrate;
a cooling pattern that is disposed on the substrate;
a plurality of solid light source elements that are disposed on the cooling pattern and are configured to irradiate light;
an optical element that is disposed in front of the plurality of solid light source elements in a light-emitting direction and is configured to diffuse the light; and
a housing that is connected to and contacts the cooling pattern,
wherein the plurality of solid light source elements are disposed in an annular form.

2. The backlight unit according to claim 1, wherein, as the optical element, a prism member that is provided to face the plurality of solid light source elements in the light-emitting direction, and a lens element that is provided between the plurality of solid light source elements and the prism member and is provided with a substantially V-shaped concave portion are included, and light emitted from the solid light source elements is diffused and emitted by the lens element and the prism member.

3. The backlight unit according to claim 1, wherein, as the optical element, a prism member provided with a substantially inverted V-shaped concave portion to face the plurality of solid light source elements in the light-emitting direction is included, and light emitted from the solid light source elements is diffused and emitted by the prism member.

4. The backlight unit according to claim 1, wherein the plurality of solid light source elements are arranged in a substantially rectangular annular form, and the solid light source elements are arranged so that a central region of each side in the substantial rectangle form is provided at a sparse interval compared to a corner portion thereof.

5. The backlight unit according to claim 1, wherein the plurality of solid light source elements are arranged in a substantially rectangular annular form, and the solid light source element in which the central region of each side in the solid light source elements arranged in the substantially rectangular form has a light quantity that is relatively smaller than that of the corner portion thereof is included.

6. The backlight unit according to claim 1, wherein the plurality of solid light source elements are arranged in a substantially circular form or a substantially elliptical annular form.

7. The backlight unit according to claim 1 wherein the solid light source elements are LEDs.

8. A liquid crystal display device comprising:
the backlight unit according to claim 1; and
a liquid crystal panel that is disposed in a light-emitting direction of the backlight unit.

9. The backlight unit according to claim 2, wherein the plurality of solid light source elements are arranged in a substantially rectangular annular form, and the solid light source elements are arranged so that a central region of each side in the substantial rectangle form is provided at a sparse interval compared to a corner portion thereof.

10. The backlight unit according to claim 3, wherein the plurality of solid light source elements are arranged in a substantially rectangular annular form, and the solid light source elements are arranged so that a central region of each side in the substantial rectangle form is provided at a sparse interval compared to a corner portion thereof.

11. The backlight unit according to claim 2, wherein the plurality of solid light source elements are arranged in a substantially rectangular annular form, and the solid light source element in which the central region of each side in the solid light source elements arranged in the substantially rectangular form has a light quantity that is relatively smaller than that of the corner portion thereof is included.

12. The backlight unit according to claim 3, wherein the plurality of solid light source elements are arranged in a substantially rectangular annular form, and the solid light source element in which the central region of each side in the solid light source elements arranged in the substantially rectangular form has a light quantity that is relatively smaller than that of the corner portion thereof is included.

13. The backlight unit according to claim 1, wherein the plurality of solid light source elements are arranged in a substantially circular form or a substantially elliptical annular form.

14. The backlight unit according to claim 3, wherein the plurality of solid light source elements are arranged in a substantially circular form or a substantially elliptical annular form.

15. The backlight unit according to claim 1, wherein the housing has a window portion at a central portion of the housing, the window portion has a frame, and the frame comes in contact with the cooling pattern over a whole circumference of the frame.

16. The backlight unit according to claim 1, wherein the optical element has a concave portion in a region facing the plurality of solid light source elements, the concave portion has two slope surfaces having a substantially V-shaped cross-section, and the two slope surfaces have a trough line biasing to a center side of the optical element with respect to a center of each solid light element.

17. A backlight unit comprising:
a plurality of solid light source elements that are configured to irradiate light; and
an optical element that is disposed in front of the plurality of solid light source elements in a light-emitting direction and are configured to diffuse the light,
wherein the plurality of solid light source elements are disposed in a substantially rectangular annular form having four sides each having corner portions and a center portion between the corner portions, and the plurality of solid light source elements at the center portion of each side of the substantially rectangular annular form are sparsely arranged compared to the plurality of solid light source elements at the corner portions of each side of the substantially rectangular annular form.

18. The backlight unit of claim 1, wherein the cooling pattern is in contact with a surface of the substrate.

19. The backlight unit of claim 18, wherein the cooling pattern includes a first surface, a second surface which is opposite the first surface, and aperture portions passing through the cooling pattern from the first surface to the second surface.

20. The backlight unit of claim 19, wherein the plurality of solid light source elements includes terminals, the terminals being disposed within the aperture portions, the terminals being in non-contact with the aperture portions, and the terminals being joined to the surface of the substrate.

* * * * *